United States Patent [19]

Etzler, IV

[11] 4,056,205
[45] Nov. 1, 1977

[54] LOADER ATTACHMENT

[76] Inventor: John Lewis Etzler, IV, Rte. 2, Box 367, Troutville, Va. 24175

[21] Appl. No.: 624,641

[22] Filed: Oct. 22, 1975

[51] Int. Cl.$^2$ ............................................. G02F 3/81
[52] U.S. Cl. ............................. 214/145 R; 37/DIG. 3
[58] Field of Search ............... 214/145, 620; 37/117.5, 37/118, 141, DIG. 3

[56] References Cited

U.S. PATENT DOCUMENTS

| | | | |
|---|---|---|---|
| 2,597,374 | 5/1952 | Richey | 214/145 R |
| 3,034,237 | 5/1962 | Wolfe et al. | 214/145 R |
| 3,043,032 | 7/1962 | Discenza | 214/145 R |
| 3,307,277 | 3/1967 | Kondracki | 214/145 R |
| 3,362,554 | 1/1968 | Fortier | 214/145 R |
| 3,706,388 | 12/1972 | Westendorf | 214/145 R |
| 3,834,567 | 9/1974 | Miller | 214/145 R |
| 3,921,837 | 11/1975 | Vandewater | 214/145 R |

Primary Examiner—Albert J. Makay
Assistant Examiner—Ross Weaver
Attorney, Agent, or Firm—Eric P. Schellin

[57] ABSTRACT

An attachment is provided for a front loader which will allow the loader to manipulate, lift, transport, and dump a large bale of fibrous material. The attachment includes a hitch which is fastened to the top surface of the front loader bucket adjacent the bucket opening, and an implement comprising a plurality of tines which are readily affixed to the hitch. In operation, the tines provide a lifting force for the load, and the bucket rim, located below the tines, stabilizes the load against any moment of rotation.

3 Claims, 5 Drawing Figures

LOADER ATTACHMENT

BACKGROUND OF THE INVENTION

This invention relates to a loader attachment for farm loaders of the front loading type. Front loaders or front loading tractors are usually provided with a bucket having forwardly facing opening which is used for material manipulation. While such a bucket is useful when working with loose granular material, larger agglomerate material, or singular still larger objects which need only be pushed to a desired location, the bucket is not able to satisfactorily manipulate or lift a large load such as a cylindrical bale of fibrous material. Such bales, including hay bales, are often several feet in diameter and half again as many feet in length. Until the present time, no apparatus was available which would enable a front loading tractor to manipulate, lift, transport, and dump a hay bale of the cylindrical type.

While it is desirable to provide an apparatus for accomplishing the above-described functions, the original functions of the front loader must not be lost. That is, an implement which will allow cylindrically shaped hay bales to be manipulated, lifted, transported, and dumped must be readily detachable to allow the front loader to operate with other load material. The implement must be able to be mounted and demounted easily by a single person. Further, the mounting must be such that it can be accomplished in a minimum amount of time.

Previous attempts have been made to modify front loaders for various modes of operation. U.S. Pat. No. 3,795,331 to Guest shows a fork lift converter attachment for a front end loader. The device comprises a pair of vertical bars pivotally attached to the uppermost extremity of a bucket, and horizontal fork elements are attached to the vertical bars at the lower ends thereof. The device is intended for lifting palletized loads and provides load support only through the action of the fork elements. U.S. Pat. No. 3,421,642 to Carter shows a similar device which operates in a similar manner. Again, the lifting elements are intended to be used with a pallet and their location and method of attachment to the load bucket precludes use with a bale of fibrous material. U.S. Pat. No. 3,097,439 to Calkin shows a scarifier attachment for a bucket-equipped earth moving machine. The scarifier element is mounted to swing in and out of operating position. When not in operating position, the device presents a forward facing tooth located above the bucket. This tooth, however, or a plurality of such teeth, would be ineffective in piercing and providing a supporting force to a bale of fibrous material.

SUMMARY OF THE INVENTION

It is an object of this invention, therefore, to provide an implement for a front loading farm loader which will enable large loads of baled material to be handled easily and efficiently, and more specifically, to provide a hitch and an implement for a front loading farm loader which will enable a large load of baled material to be manipulated, lifted, transported and dumped.

It is a further object to provide a hitch with an implement for a front loader which will not impair the ability of a front loader to handle loads other than large cylindrical bales of fibrous material.

It is a further object to provide an implement for a front loader which is able to be easily and quickly mounted on or demounted from the front loader by a single person.

These and other objects and advantages of the invention will appear more fully from the following description made in connection with the accompanying drawings, wherein like reference characters refer to the same or similar parts throughout the several views.

DETAILED DESCRIPTION OF THE PREFERRED EMBODIMENTS

Figure 1:
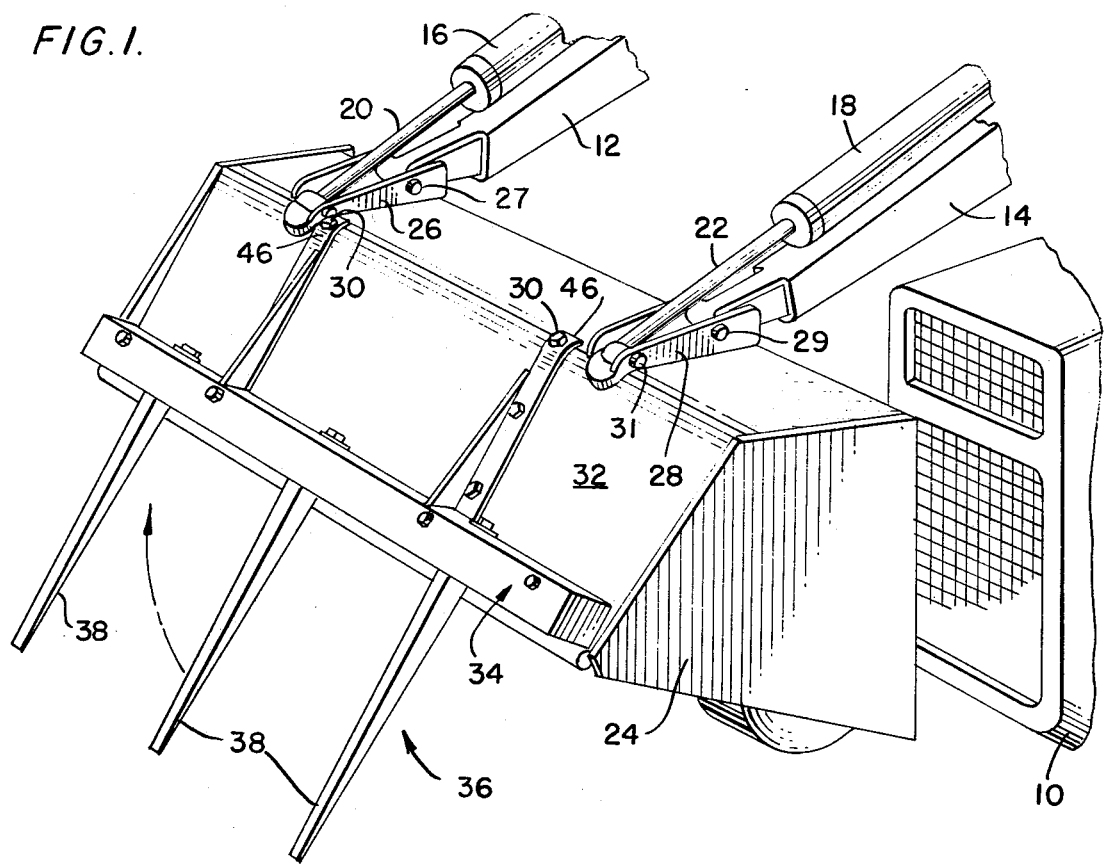
FIG. 1 is a front perspective view showing the forward portion of a front loader or a front loading tractor including the tractor bucket with a hitch and implement attached.

Referring now to the drawings in greater detail, FIG. 1 shows the forward portion of a front loader 10 having vertically adjustable lift arms 12 and 14. Mounted on the lift arms by means not shown are hydraulic actuating cylinders 16 and 18 having drive rods 20 and 22, respectively. The lift arms are connected to bucket 24 by rear brackets 26 and 28 at pivot points 27 and 29 while drive rods 20 and 22 are connected at pivot points 30 and 31 and control the tilt of said bucket. Attached to the bucket 24 on top surface 32 is a hitch indicated generally at 34 having a width approximately equal to the width of said bucket, and an implement indicated generally at 36. The implement comprises a plurality of tines 38.

Figure 2:
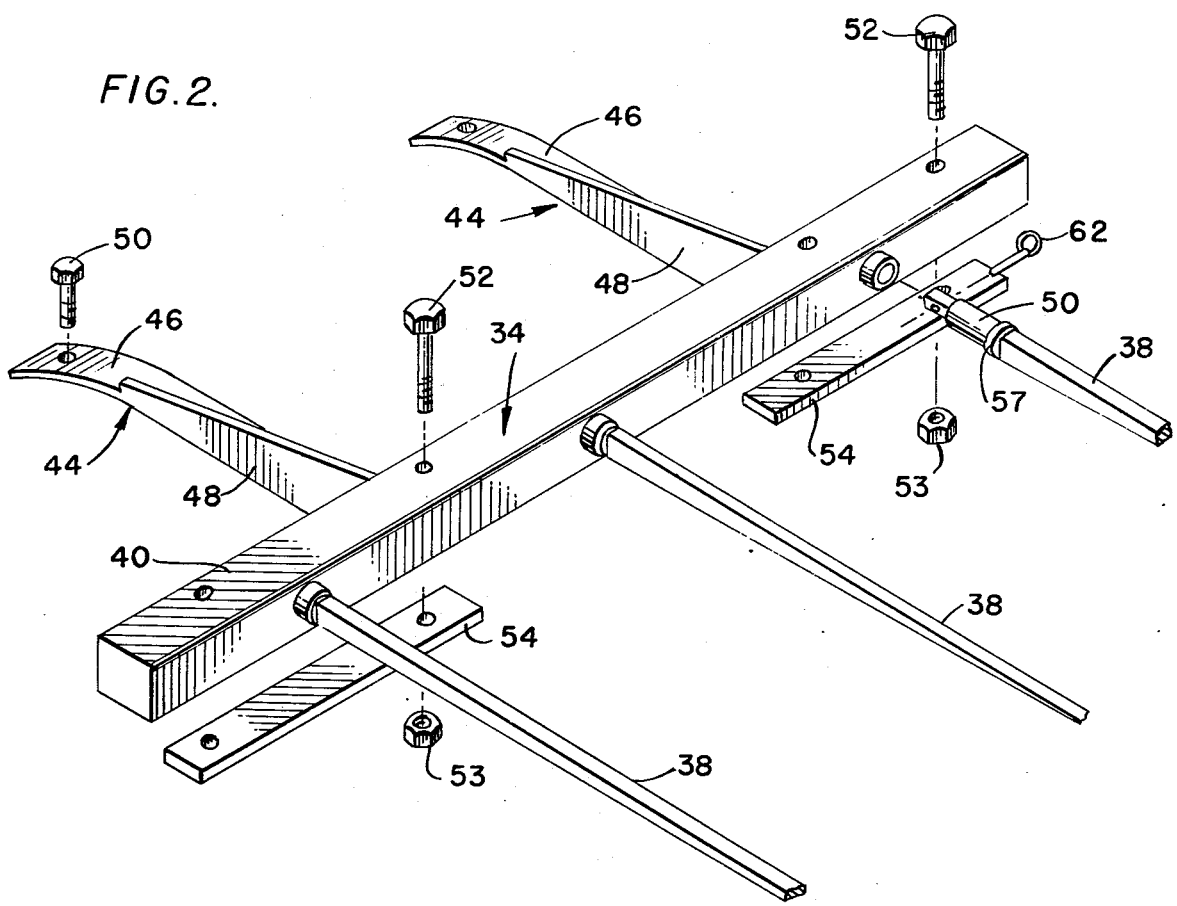
FIG. 2 is an exploded view of a hitch and an implement.
Figure 3:
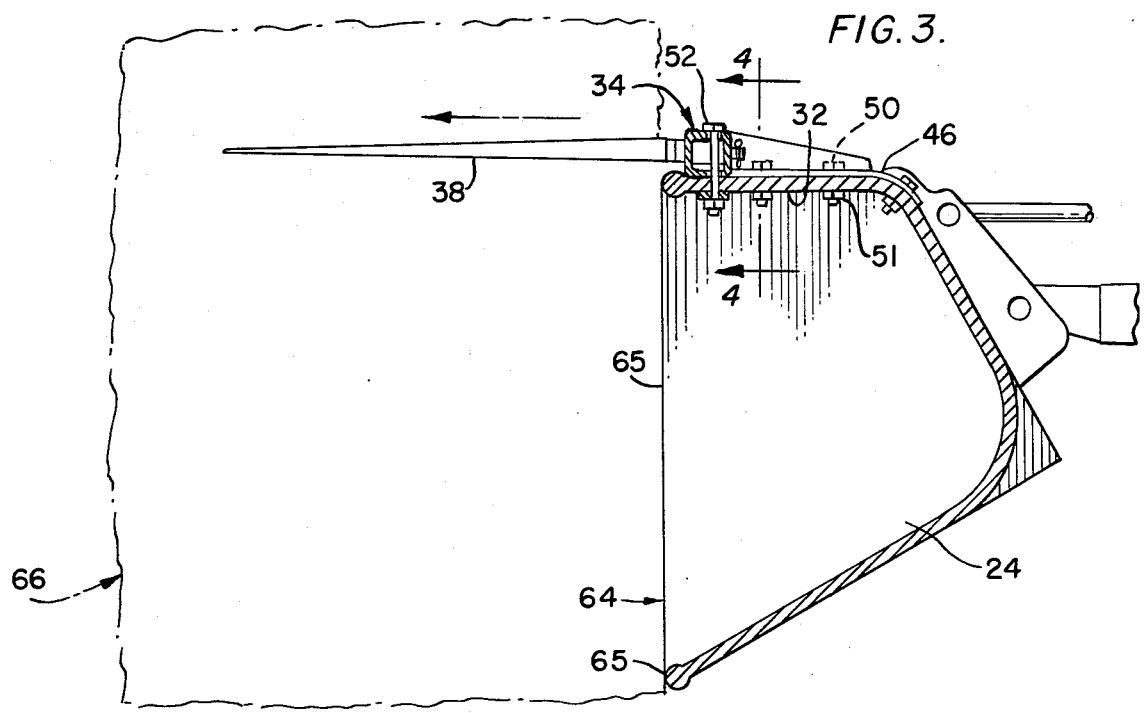
FIG. 3 is a sectional view of a tractor bucket with a hitch and an implement attached.
Figure 5:
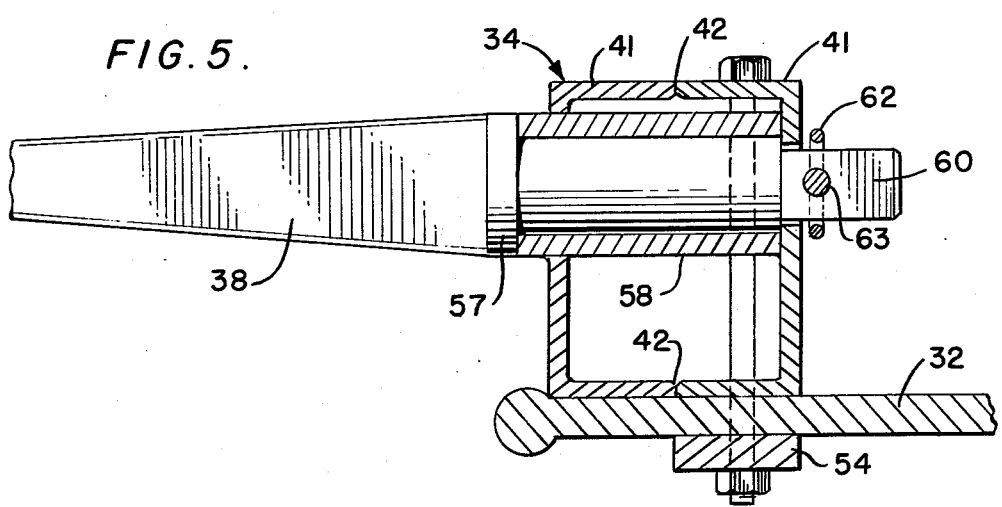
FIG. 5 is a sectional view of a tractor bucket, hitch, and implement taken along lines 5—5 of FIG. 4.

FIG. 2 shows in greater detail the construction of the hitch and the implement. An elongated box-shaped member 40 comprises two U-shaped channel members 41 welded together at 42 as shown at FIG. 5. The box-shaped member may be closed at either end by plates welded into place. To the rear of the boxshaped member 40 are a pair of brackets 44 which comprise horizontal portions 46 and vertical upstanding portions 48. The brackets are fixed to the box-shaped member by any suitable means such as welding. A plurality of bolts 50 cooperating with nuts 51 fix the brackets to the top surface 32 of bucket 24 as can be seen in FIG. 3. Additional bolts 52 pass through the box member, the bucket, and backing straps 54 to thread with nuts 53. The backing straps provide reinforcement to that region of bucket surface 32 to which the box member is attached. The implement 36 comprising tines 38 projects forwardly from the hitch 34. The tines are substantially tapered to a point for reasons hereinafter described and are mounted to box member 40 by means of reduced portion 56 which is received by sleeve 58 contained within the box member as shown in FIG. 5. The sleeve may be welded into place or affixed by alternate means. A shoulder 57 limits the travel of reduced portion 56 into sleeve 58. A further reduced square cross section 60 on tines 38 passes through a squareshaped aperture in the rear of box member 40. A readily removable mechanical retainer such as a standard snap pin 62, well known in the art, passes through aperture 63 in square section 60 to prevent the tines from being withdrawn from the box member 40. Of course, other retaining means may be substituted for snap pins 62 as will be readily apparent to those skilled in the art.

Referring to FIG. 3, the hitch 34 with implement 36 attached is shown together with bucket 24. It will be noted that the rearmost portion of bracket portion 46 is curved slightly to compliment the shape of the bucket at that point. Further, upstanding portion 48 is dimensioned to be able to be fixed as by welding to the rear of box member 40 along the entire height of the member at that point where the upstanding portion 48 and the box member 40 meet. As shown, the tines 38 of the implement are parallel to the top surface 32 of bucket 24 and are at an angle to the plane of the front opening 64 of the bucket.

Figure 4:
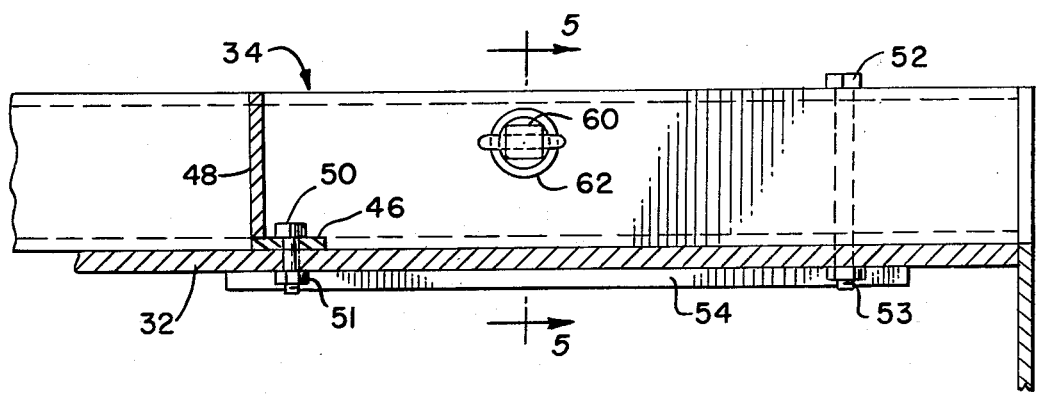
FIG. 4 is a sectional view of a hitch and bucket taken along lines 4—4 of FIG. 3.

FIG. 4 shows in a fragmentary manner the rear of box member 40 including the protruding square cross section 60 of tines 38 and the retaining snap pin 62. Bolt 52, nut 53, and backing straps 54 secure box member 40 to surface 32. Bolt 50 and nut 51 secure bracket portion 46 to surface 32.

A load, indicated generally at 66 by dotted lines, is handled in the following manner. The front loader 10 with hitch 34 and implement 36 attached advances toward load 66. The sharpened ends of tines 38 impale and penetrate the load until the forward rim 65 defining front opening 64 of the bucket comes into contact with the load. The bucket with the load is then lifted by arms 12 and 14. It will be readily appreciated that the implement and the bucket are applying two forces to the load. The tines of the implement provide an upward lifting force and the forward rim 65 provides a lateral force against the side of the load resisting any moment of rotation of the load about the tines, thus stabilizing the load. The load is thus secure and the front loader may transport the load to the desired location where by tilting the bucket downwardly by means of hydraulic cylinders 16 and 18 and drive rods 20 and 22, the load will slide off the tines. Alternatively, if the load is placed upon a support, the tines may be laterally withdrawn. It will be appreciated that the load has been lifted, transported, and manipulated by the loader with the bucket attached, contrary to the prior art devices.

It will be readily apparent that the device as described greatly extends the usefulness of a front loader. It is important to note that the hitch, together with the implement, allows large bulky loads of fibrous material to be manipulated with the bucket of the front loader attached. Because of the snap ring fastening of the implement to the hitch, the implement may be readily affixed or removed from the hitch by a single person in a very short time. Because the hitch is small and out of the way of the front opening of the bucket, once attached, it may be left in place without interfering with the normal use and operation of the bucket. Other implements may be attached to the front loader by means of the hitch to further extend the usefulness of the loader. While the hitch and implement have been disclosed for use with large cylindrical loads of fibrous material, rectangular loads, or hollow loads such as large diameter pipe may be handled as well. Within the purview of the invention is the contemplated use of fewer of the tines of the implement, depending upon the load to be handled. The material of construction will in the present instance be steel. However, other essentially rigid, high-strength, self-sustaining materials are also employable in carrying out the precepts of the invention.

It will be obvious to those skilled in the art that various changes may be made without departing from the spirit of the invention and, therefore, the invention is not limited to what is shown in the drawings and described in the specification but only as indicated in the appended claims.

What is claimed is:

1. An implement receiving hitch for use with a front loader having a pair of vertically adjustable lift arms and a load bucket having a top surface and a front opening defined by a rim, said hitch comprising:
    an elongated hollow four-sided box-shaped member having a length substantially equal to the length of said load bucket,
    a plurality of apertures formed in first and second sides of said box-shaped member,
    sleeve means for lining said apertures and for receiving said implement,
    bracket means for attaching said box-shaped member to said load bucket,
    backing straps located within said load bucket,
    first threaded fastening means for attaching said hitch to said load bucket, said first fastening means passing through third and fourth sides of said elongated box-shaped member, the top surface of said load bucket, and said backing straps, and
    second fastening means for attaching said bracket means to said load bucket.

2. The hitch of claim 1 wherein
    said implement includes a plurality of tines having first and second ends,
    the first ends of said tines have a reduced section which is received by said sleeve lined apertures and a shoulder for limiting the travel of said reduced section into said apertures,
    readily removable mechanical means retain said tines in said apertures,
    the second ends of said tines are essentially tapered to a point, and
    said tines define a plane which is essentially parallel to and above the top surface of said load bucket, whereby a load may be supported by being pierced by said implement and stabilized by said rim.

3. An implement receiving hitch for use with a front loader having a pair of vertically adjustable lift arms and a load bucket having a top surface and a front opening defined by a rim, said hitch comprising:
    an elongated mounting member having a length substantially equal to the length of said load bucket,
    a first set of aperture means formed in said mounting member for receiving said implement,
    bracket means for attaching said member to the top surface of said load bucket adjacent the rim,
    backing means located within said load bucket,
    first threaded fastening means for attaching said hitch to said load bucket, said first fastening means passing through said bracket means and said load bucket,
    second threaded fastening means for attaching said hitch to said load bucket, and
    a second set of aperture means formed in said mounting member for receiving said second threaded fastening means, the second threaded fastening means passing through said mounting member, the top surface of said load bucket, and said backing means, said first set of aperture means passing through said member in a direction which is perpendicular to the direction of passage of said second set of aperture means through said member.

* * * * *